United States Patent
Myojin et al.

(10) Patent No.: US 12,423,602 B2
(45) Date of Patent: Sep. 23, 2025

(54) DATA-CREATION ASSISTANCE APPARATUS AND DATA-CREATION ASSISTANCE METHOD

(71) Applicant: HITACHI, LTD., Tokyo (JP)

(72) Inventors: Tomoyuki Myojin, Tokyo (JP); Hironobu Kuruma, Tokyo (JP); Naoto Sato, Tokyo (JP); Hideto Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 953 days.

(21) Appl. No.: 17/550,285

(22) Filed: Dec. 14, 2021

(65) Prior Publication Data

US 2022/0222552 A1 Jul. 14, 2022

(30) Foreign Application Priority Data

Jan. 14, 2021 (JP) ................. 2021-003982

(51) Int. Cl.
- *G06N 5/04* (2023.01)
- *G06F 18/21* (2023.01)
- *G06N 3/084* (2023.01)
- *G06N 5/048* (2023.01)

(52) U.S. Cl.
CPC ......... *G06N 5/048* (2013.01); *G06F 18/2193* (2023.01); *G06N 3/084* (2013.01)

(58) Field of Classification Search
CPC .................................................... G06N 3/084
See application file for complete search history.

(56) References Cited

U.S. PATENT DOCUMENTS

| | | | |
|---|---|---|---|
| 2014/0052425 A1* | 2/2014 | Selvaraj | G06N 7/02 703/6 |
| 2018/0341876 A1 | 11/2018 | Ghosh et al. | |
| 2020/0125953 A1* | 4/2020 | Yoo | G06N 5/04 |
| 2020/0151574 A1* | 5/2020 | Matsuo | G06N 3/084 |

(Continued)

FOREIGN PATENT DOCUMENTS

JP 2018-200677 A 12/2018

OTHER PUBLICATIONS

Tran et al ("Bayesian Layers: A Module for Neural Network Uncertainty" 2019) (Year: 2019).*

(Continued)

*Primary Examiner* — Lut Wong
(74) *Attorney, Agent, or Firm* — Baker Botts L.L.P.

(57) ABSTRACT

To efficiently verify and improve a robustness of a learning model for supervised machine learning. A data-creation assistance apparatus 100 includes: a storage device 101 configured to store a neural network model 110 and test data 120; and a computing device 104 configured to specify an uncertainty of an inference result acquired by the neural network model 110; acquire gradient information of the test data 120 by a back propagation process using the uncertainty as a loss; apply various minute changes to the test data 120 to generate a plurality of minutely changed test data, and calculate deviations between each of the plurality of pieces minutely changed test data and the test data 120; and specify, based on the uncertainty information, the gradient information, and the deviations, a minute change that increases or decreases the uncertainty.

9 Claims, 13 Drawing Sheets

(56) References Cited

U.S. PATENT DOCUMENTS

2020/0302596 A1* 9/2020 Yoo .......................... G06T 7/11

OTHER PUBLICATIONS

Gal et al ("Dropout as a Bayesian Approximation: Representing Model Uncertainty in Deep Learning" 2016) (Year: 2016).*
Extended European Search Report, mailed Jul. 4, 2022, for European Application No. 21216309.1.
Shafahi, A., et al., "Universal Adversarial Training", Arxiv.Org, Cornell University Library, 2018, 12 pages.
Liu, H., et al. "Universal Adversarial Perturbation via Prior Driven Uncertainty Approximation", 2019 IEEE/CVF International Conference on Computer Vision (ICCV), IEEE, 2019, pp. 2941-2949.

* cited by examiner

FUNCTIONAL CONFIGURATION EXAMPLE (FIRST EMBODIMENT)

FUNCTION OUTLINE (FIRST EMBODIMENT)

FUNCTION OUTLINE (FIRST EMBODIMENT)

CONFIGURATION EXAMPLE OF APPARATUS (SECOND EMBODIMENT)

CONFIGURATION EXAMPLE OF APPARATUS (THIRD EMBODIMENT)

FUNCTION OUTLINE (THIRD EMBODIMENT)

DATA-CREATION ASSISTANCE APPARATUS AND DATA-CREATION ASSISTANCE METHOD

CROSS-REFERENCE TO RELATED APPLICATIONS

This application claims priority pursuant to Japanese patent application No. 2021-003982, filed on Jan. 14, 2021, the entire disclosure of which is incorporated herein by reference.

BACKGROUND OF THE INVENTION

1. Field of the Invention

The present invention relates to a data-creation assistance apparatus and a data-creation assistance method.

2. Description of the Related Art

Since Internet of Things (IoT) technique is widely used and a large amount of observation data can be acquired, a machine learning technique that efficiently specifies some significant events and rules from such data continues to evolve.

In such machine learning, that is, supervised machine learning, by giving a training data group to which a label is attached to a learning model, learning that recognizes features of an event indicated by the training data with high accuracy and derives a correct inference result, that is, a value of the label proceeds.

Superficially, there are cases where emphasis is only placed on a fact that the inference result acquired by such machine learning is a ground truth, but the "ground truth" may also include, for example, a result of a "ground truth" even for data (having a different distribution) that is not included in the training data and that would otherwise be difficult to derive the ground truth.

Of course, it is an advantage of machine learning to acquire features outside the training data as a generalization performance, but it is not desirable to have a situation in which the correct answer is made even for those that have obviously not been learned.

As a related-art technique related to such supervised machine learning, for example, a technique (see JP-A-2018-200677) for adjusting parameters of a deep learning network so as to optimize an accuracy and an uncertainty of a prediction at the same time has been proposed.

This technique is a management method that initializes deep learning architecture parameters of a predefined base architecture, performs a model training based on the deep learning architecture parameters to generate a trained model, iteratively applies Monte Carlo (MC) dropout to the generated trained model to acquire the accuracy and the uncertainty of the prediction, configures a fitness function to evaluate the accuracy and the uncertainty of the prediction of the trained model, in which when the fitness function indicates that the trained model is not optimized, the deep learning architecture parameters is updated to iterate over the generation of the trained model and the evaluation of the fitness function, and when the fitness function indicates that the trained model has been optimized, the trained model for the prediction is provided.

A point in recognizing a problem related to the "correct answer" described above is a difference between the accuracy and the uncertainty. Originally, a case where the correct answer is given regardless of an intention of a developer, even though learning has not been performed, is a situation in which the accuracy is high but the uncertainty is also high, which is undesirable.

Therefore, it is necessary to perform verification in terms of whether the learned machine learning model outputs an inference result according to a specification (training data) as test data, whether the inference result can be trusted no matter how far the data is from the specification, and whether the learned machine learning model not only simply outputs the ground truth (with high accuracy) but also whether learned machine learning model makes the correct answer to those that should be made a correct answer and does not make a correct answer to those that should not be made a correct answer.

According to the related-art technique, a learning method for optimizing the uncertainty and the accuracy at the same time is presented, but no mechanism is disclosed to verify what kind of data indicates the uncertainty or certainty (and how the data indicates the uncertainty or certainty in the inference result). As a result, it is not possible to efficiently verify and improve a robustness of the learning model.

SUMMARY

Therefore, an object of the invention is to provide a technique for efficiently verifying and improving the robustness of the learning model for supervised machine learning.

In order to solve the above problem, a data-creation assistance apparatus of the invention includes: a storage device configured to store neural network model used for supervised machine learning and test data attached with a label of ground truth; and a computing device configured to execute a process of specifying an uncertainty of an inference result from the neural network model by inputting the test data to the neural network model; a process of acquiring gradient information of the test data by a back propagation process using the uncertainty as a loss; a process of generating a plurality of minutely changed test data obtained by applying a minute change to the test data and calculating deviations between each of the plurality of minutely changed test data and the test data; and a process of specifying, based on the uncertainty information, the gradient information, and the deviations, the minute change that increases or decreases the uncertainty or minutely changed test data to which the minute change is applied.

Further, a data-creation assistance method of the invention is realized by an information processing apparatus configured to execute: a process of storing a neural network model used for supervised machine learning and test data attached with a label of ground truth, and inputting the test data into the neural network model to specify an uncertainty of an inference result from the neural network model; a process of acquiring gradient information of the test data by a back propagation process using the uncertainty as a loss; a process of generating a plurality of minutely changed test data obtained by applying a minute change to the test data, and calculating deviations between each of the plurality of pieces minutely changed test data and the test data; and a process of specifying, based on information of the uncertainty, the gradient information, and the deviations, a minute change that increases or decreases the uncertainty or minutely changed test data to which the minute change is applied.

According to the invention, it is possible to efficiently verify and improve the robustness of the learning model for supervised machine learning.

DESCRIPTION OF THE PREFERRED EMBODIMENTS

Examples of Apparatus Configuration

Figure 1:
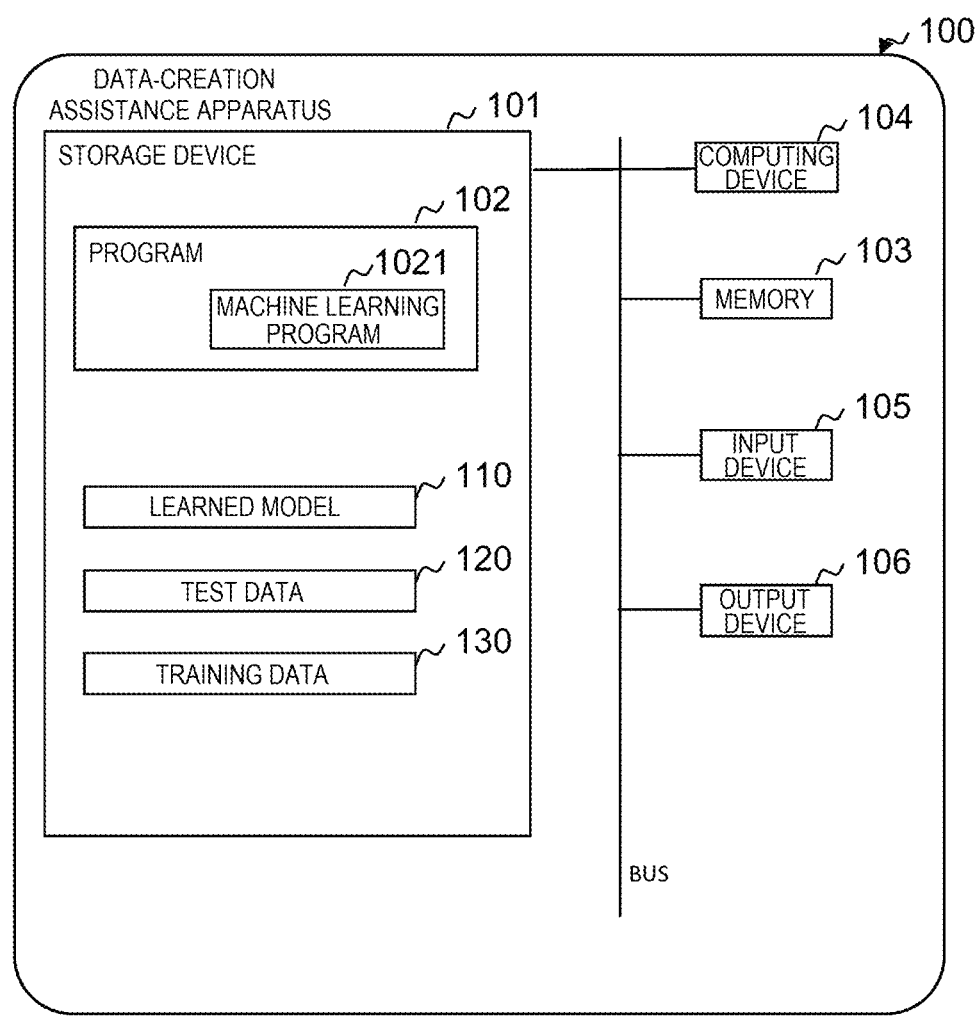
FIG. 1 is a diagram illustrating a configuration example of hardware of a data-creation assistance apparatus according to the present embodiment.

Hereinafter, embodiments of the invention will be described in detail with reference to drawings. FIG. 1 is a diagram illustrating a configuration example of hardware of a data-creation assistance apparatus 100 according to the present embodiment. The data-creation assistance apparatus 100 illustrated in FIG. 1 is a computer device that efficiently verifies and improves a robustness of a learning model for supervised machine learning.

The hardware configuration of the data-creation assistance apparatus 100 is as follows. That is, the data-creation assistance apparatus 100 includes a storage device 101, a memory 103, a computing device 104, an input device 105, and an output device 106.

The storage device 101 includes an appropriate nonvolatile storage element such as a solid-state drive (SSD) or a hard disk drive.

The memory 103 includes a volatile storage element such as a RAM.

The computing device 104 is a CPU that executes a program 102 stored in the storage device 101 by, for example, reading the program 102 into the memory 103, and performs a general control of the device itself as well as various determinations, calculations, and control processes.

The program 102 according to the present embodiment includes a machine learning program 1021 in addition to an operating system (OS) naturally provided in an information processing apparatus and a program that operates on the OS and implements a data-creation assistance method. The machine learning program 1021 is an algorithm that, for example, gives appropriate data such as test data to an appropriate learned model 110 such as a neural network model to perform a predetermined determination, estimation, and the like on the data.

The input device 105 is an appropriate device such as a keyboard, a mouse, or a microphone that receives a key input or a voice input from a user.

The output device 106 is an appropriate device such as a display or a speaker that displays processed data in the computing device 104.

In addition to the above-described program 102, the storage device 101 is capable of storing the learned model 110, test data 120, and training data 130. Specific contents of these will be described later.

Examples of Functional Configuration

Figure 2:
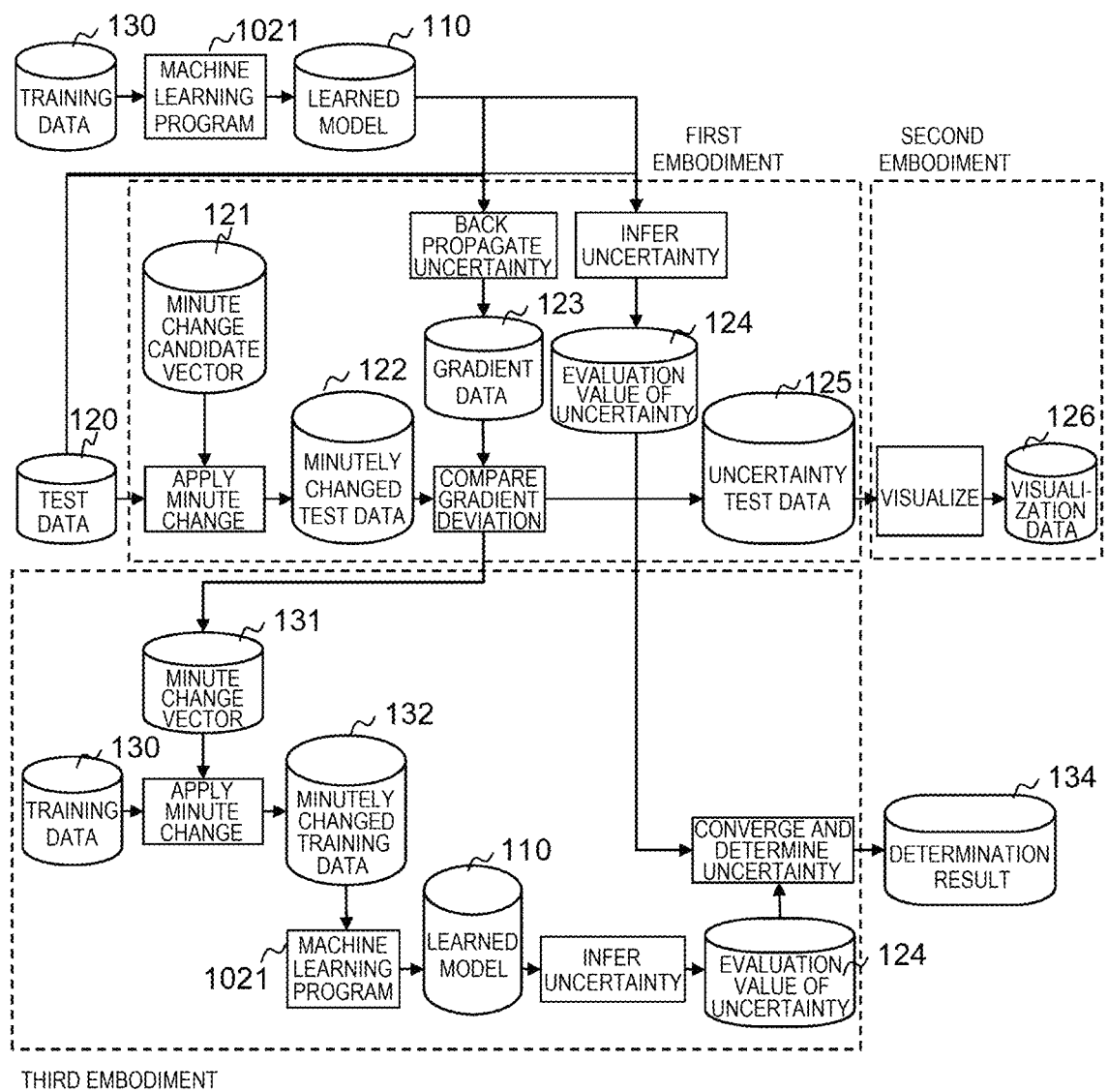
FIG. 2 is a diagram illustrating a functional configuration example of the data-creation assistance apparatus according to the present embodiment.

FIG. 2 is a diagram illustrating a functional configuration example of the data-creation assistance apparatus 100 according to the present embodiment. In addition to configurations necessary as machine learning functions, such as the machine learning program 1021, the learned model 110 (neural network model), the test data 120, and the training data 130, the data-creation assistance apparatus 100 according to the present embodiment further includes an uncertainty back propagation unit 111, an uncertainty inference unit 112, a minute change applying unit 113, a gradient deviation comparison unit 114, an uncertainty data display unit 115, an uncertainty convergence determination unit 116, and a model learning unit 117.

The data-creation assistance apparatus 100 including such functional units gives the training data 130 to the machine learning program 1021 to advance learning of the learned model 110, which is a neural network model, at any time.

The training data 130 is data to which a label of ground truth is attached, such as, image data in which a name or an attribute of a subject is defined as a ground truth, IoT data in which a possibility of occurrence of a failure in an equipment is defined as a ground truth.

Therefore, when data to be processed such as the test data is prepared and given to the learned model 110 by the machine learning program 1021, the meanings of the data, such as "male in his thirties", "cat", and "failure occurrence probability 60%", are output as estimation results.

Since the learned model 110 that is updated in this way is the neural network model as described above, as the estimation results for the test data 120, in addition to information that can be uniquely specified as described above, an average and a variance of a distribution of the estimation results can be obtained as uncertainty information.

Therefore, the data-creation assistance apparatus 100 executes, for example, a back propagation process using a value of the variance described above as a loss, and acquires gradient data 123 of the test data 120. An existing technique may be appropriately adopted for the back propagation process in the machine learning algorithm and a method itself for obtaining gradient data in accordance with the back propagation process.

Further, the data-creation assistance apparatus 100 applies predetermined minute changes to the test data 120 described above, and generates a plurality of minutely changed test data 122. In this case, it is necessary to avoid that a direction of the minute change is different from a development intention of the user or the like or that becomes unfavorable from data characteristics (example: characters and images have completely different main shapes and change in a direction that makes it difficult for humans to recognize. For example, the presence or absence of ear images of animals having distinctive ears and changes that clearly change an outer shape, etc.).

Therefore, it is preferable that the data-creation assistance apparatus 100 acquires a minute change candidate vector 121 indicating the direction suitable for such minute changes by receiving a designation from the user in advance or by a predetermined method, and applies the minute change candidate vector 121 in the case of the minute change described above. This method specifies, for example, a direction, that is, a vector of the minute changes similar to the gradient indicated by the gradient data described above.

The data-creation assistance apparatus 100 calculates a deviation between each of the plurality of minutely changed test data 122 created as described above and the test data 120, and acquires and stores, based on the variance (uncertainty information) of the estimation results, the gradient data 123, and the deviations obtained so far, the minute change by which the variance (uncertainty) of the estimation results increases or decreases or the minutely changed test data to which the minute change is applied, as uncertainty test data 125.

The data-creation assistance apparatus 100 generates visualization data 126 by, for example, setting information of the uncertainty test data 125 in a predetermined screen format, and displaying the visualization data 126 on the output device 106.

Further, the data-creation assistance apparatus 100 uses the training data 130 (attached with the label of ground truth) stored in the storage device 101 as an input, and uses a minute change vector 131 included in the minutely changed test data 122 to generate minutely changed training data 132 obtained by applying a minute change to the training data 130.

The data-creation assistance apparatus 100 further executes a relearning process of the learned model 110 (that is, the neural network model) by giving the minutely changed training data 132 to the learned model 110 by the machine learning program 1021.

In this case, the data-creation assistance apparatus 100 uses the learned model 110 that has undergone the relearning to specify an evaluation value 124 of the uncertainty such as the variance described above by using a predetermined test data as an input, and determines whether the uncertainty is above or below a predetermined threshold. The data-creation assistance apparatus 100 acquires a determination result as a determination result 134 of an uncertainty convergence, and displays the determination result on, for example, the output device 106.

In a case where the above uncertainty is above or below the predetermined threshold, the data-creation assistance apparatus 100 further advances the relearning process of the learned model 110 by giving the minutely changed training data 132 to the learned model 110.

First Embodiment

Hereinafter, an actual procedure of the data-creation assistance method according to the present embodiment will be described with reference to drawings. Various operations corresponding to the data-creation assistance method described below are implemented by a program that is read by the data-creation assistance apparatus 100 into a memory or the like and executed. The program includes codes for performing the various operations described below.

Figure 3:
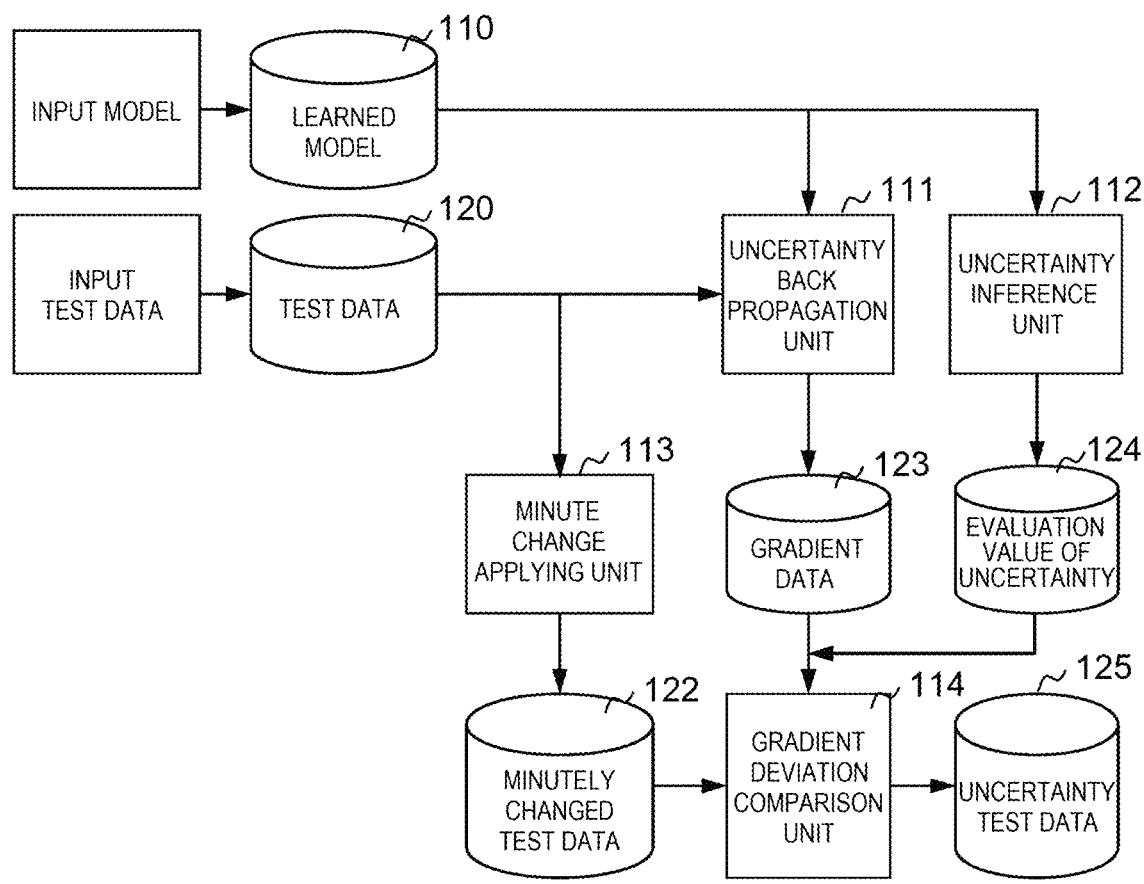
FIG. 3 is a diagram illustrating a functional configuration example of the data-creation assistance apparatus according to a first embodiment.
Figure 4:
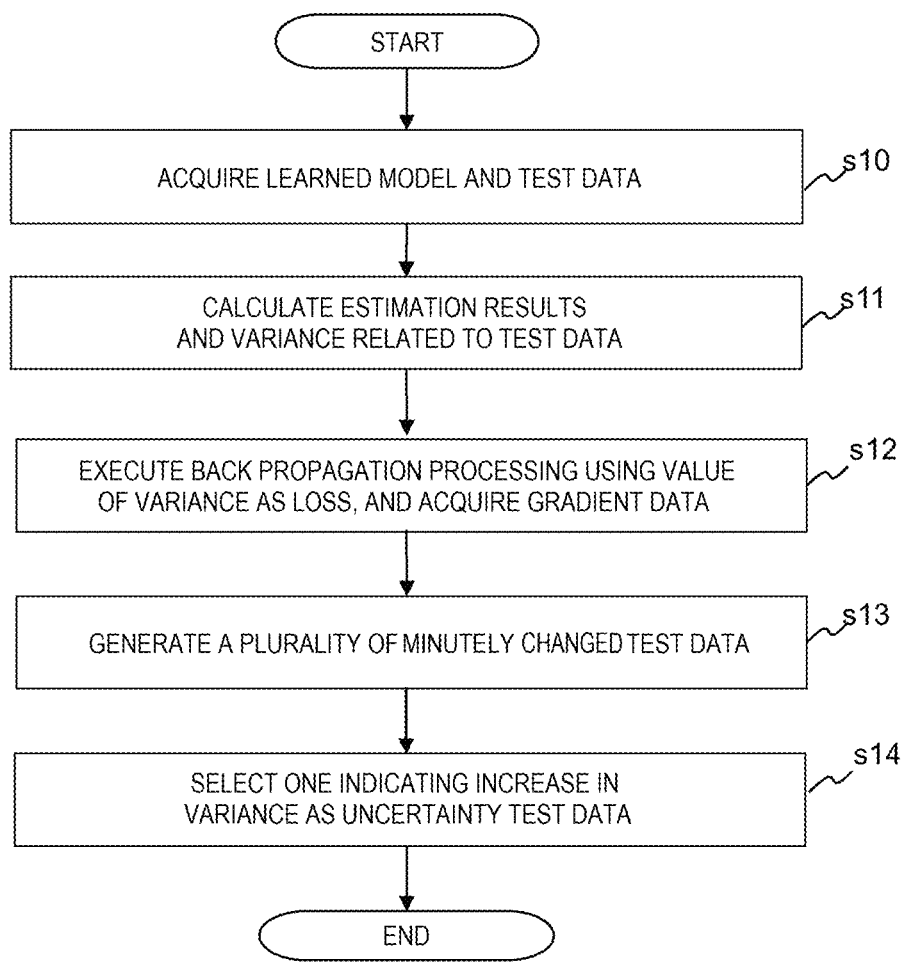
FIG. 4 is a diagram illustrating an example of a flow of a data-creation assistance method according to the first embodiment.

FIG. 3 is a diagram illustrating a functional configuration example of the data-creation assistance apparatus 100 according to the first embodiment, and FIG. 4 is a diagram illustrating an example of a flow of the data-creation assistance method according to the first embodiment. Further, actions of each function illustrated in FIG. 3 have already been described.

In this case, the data-creation assistance apparatus 100 acquires, via the input device 105, for example, by an operation of a user, the learned model 110 that is a neural network model and the test data 120 thereof (s10).

Thereafter, the uncertainty inference unit 112 of the data-creation assistance apparatus 100 gives the test data 120 to the learned model 110, and obtains a variance of a distribution of estimation results as the evaluation value 124 of the uncertainty of the estimation results for the test data 120 described above (s11).

The uncertainty back propagation unit 111 of the data-creation assistance apparatus 100 executes a back propagation process using the value of the variance obtained in s11 described above as a loss, and acquires the gradient data 123 of the test data 120 (s12).

In addition, an existing technique may be appropriately adopted for the back propagation process in a machine learning algorithm and a method itself for obtaining gradient data in accordance with the back propagation process.

The minute change applying unit 113 of the data-creation assistance apparatus 100 gives a predetermined minute change to the test data 120 described above and generates the plurality of minutely changed test data 122 (s13). In this case, it is necessary to avoid that a direction of the minute change is different from a development intention of the user or the like or that becomes unfavorable from data characteristics (example: characters and images have completely different main shapes and change in a direction that makes it difficult for humans to recognize. For example, the presence or absence of ear images of animals having distinctive ears and changes that clearly change an outer shape, or the like).

Therefore, it is assumed that the data-creation assistance apparatus 100 acquires the minute change candidate vector 121 indicating the direction suitable for such minute change by receiving a designation from the user in advance or by a predetermined method, and applies the minute change candidate vector 121 in the case of the minute change described above.

This method can be assumed to specify, for example, a direction, that is, a vector of the minute changes similar to a gradient indicated by the gradient data described above.

Next, the gradient deviation comparison unit 114 of the data-creation assistance apparatus 100 calculates deviations between each of the plurality of minutely changed test data 122 created as described above and the test data 120 and specifies and stores, based on the variance (uncertainty information) of the estimation results, the gradient data 123, and the deviations obtained so far, the minute change by which the variance (uncertainty) of the estimation results increases or decreases or the minutely changed test data to which the minute change is given, as the uncertainty test data 125 (s14), and this process is ended.

In this case, the gradient deviation comparison unit 114 of the data-creation assistance apparatus 100 compares, in response to specify one among the plurality of minutely changed test data 122 as the uncertainty test data 125, each of the plurality of minutely changed test data 122 with the gradient data and identifies minutely changed test data 122 that is most similar to the gradient indicated by the gradient data. For a determination of similarity, for example, a concept may be adopted in which the inner product of each vector from each of the plurality of minutely changed test data 122 to the gradient data is calculated, and the one with the largest calculated value has the maximum similarity.

As such an algorithm for obtaining the average and variance values of the estimation results by the learned model 110, a Bayesian neural network or Monte Carlo dropout sampling (MC dropout) of an approximation method thereof may be adopted. Therefore, the machine learning program 1021 in the data-creation assistance apparatus 100 is capable of mounting in advance and using such an algorithm of the MC dropout.

Figure 5:
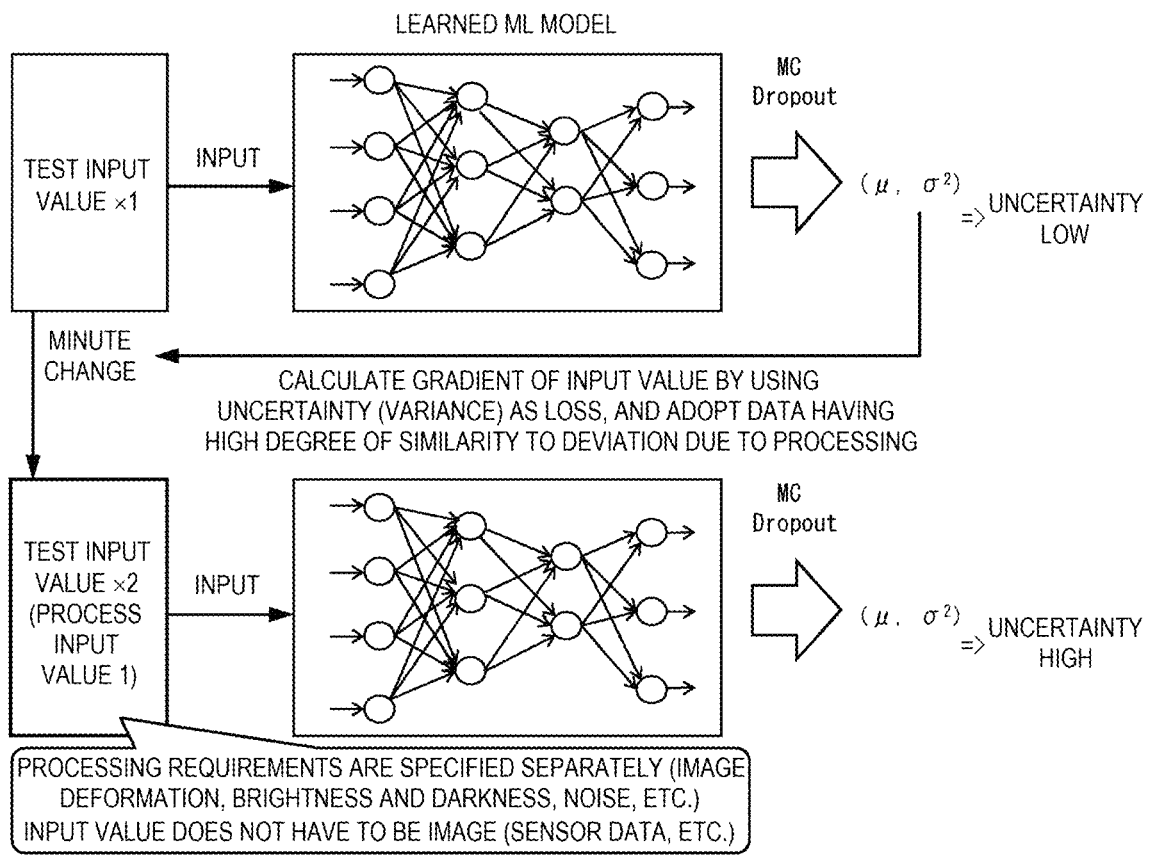
FIG. 5 is a diagram illustrating a conceptual example of the data-creation assistance method according to the first embodiment.

In response to specify the uncertainty shown in the flow described above or generate the minutely changed test data 122, as shown in FIG. 5, first, test data X1, which is a base, is given to the learned model 110, and through a process with the MC dropout described above, the average value and the variance value of an inference result obtained for the test data X1 are identified.

Further, the gradient data is acquired by using the obtained variance, which is the value of the uncertainty, as a loss and executing the back propagation process related to the test data X1.

The minute change applying unit 113 of the data-creation assistance apparatus 100 applies predetermined various minute changes to the test data X1 described above and generates a plurality of minutely changed test data X2. Among the plurality of minutely changed test data X2 created in this way, a minute change by which the variance (uncertainty) of the estimation results increases or the minutely changed test data to which the minute change is given is acquired and stored as the uncertainty test data 125.

Figure 6:
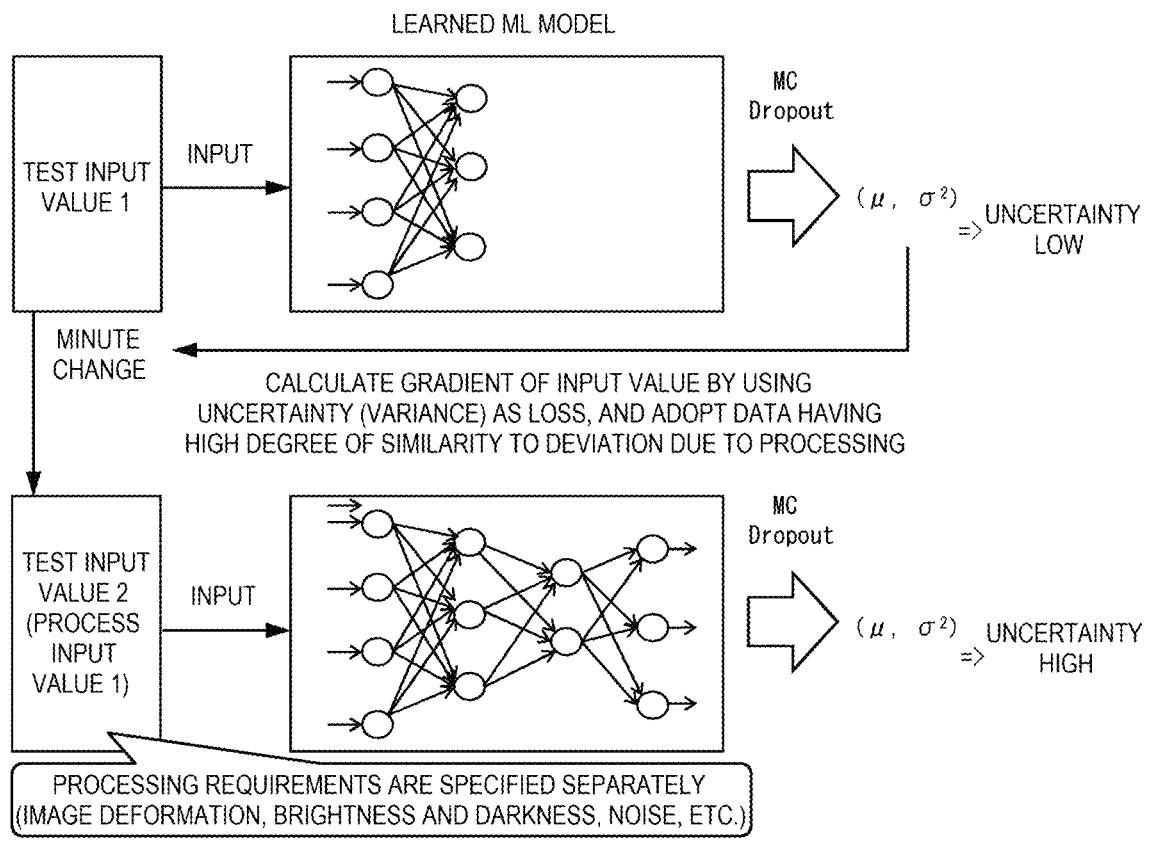
FIG. 6 is a diagram illustrating a conceptual example of the data-creation assistance method according to the first embodiment.

Further, in response to specify the variance or the gradient data or generate the minutely changed test data, as illustrated in FIG. 6, it is more preferable to execute a dropout inference process a plurality of times, in this process, the test data is used as an input, an output of neurons in an intermediate layer included in the learned model 110 is randomly set to 0, and an inference result is output.

In this case, the data-creation assistance apparatus 100 acquires a plurality of the dropout inference results, and specifies the variance related to the plurality of dropout inference results as the uncertainty.

By performing such process, it is possible to effectively deal with an overfitting problem with limited resources.

Figure 7:
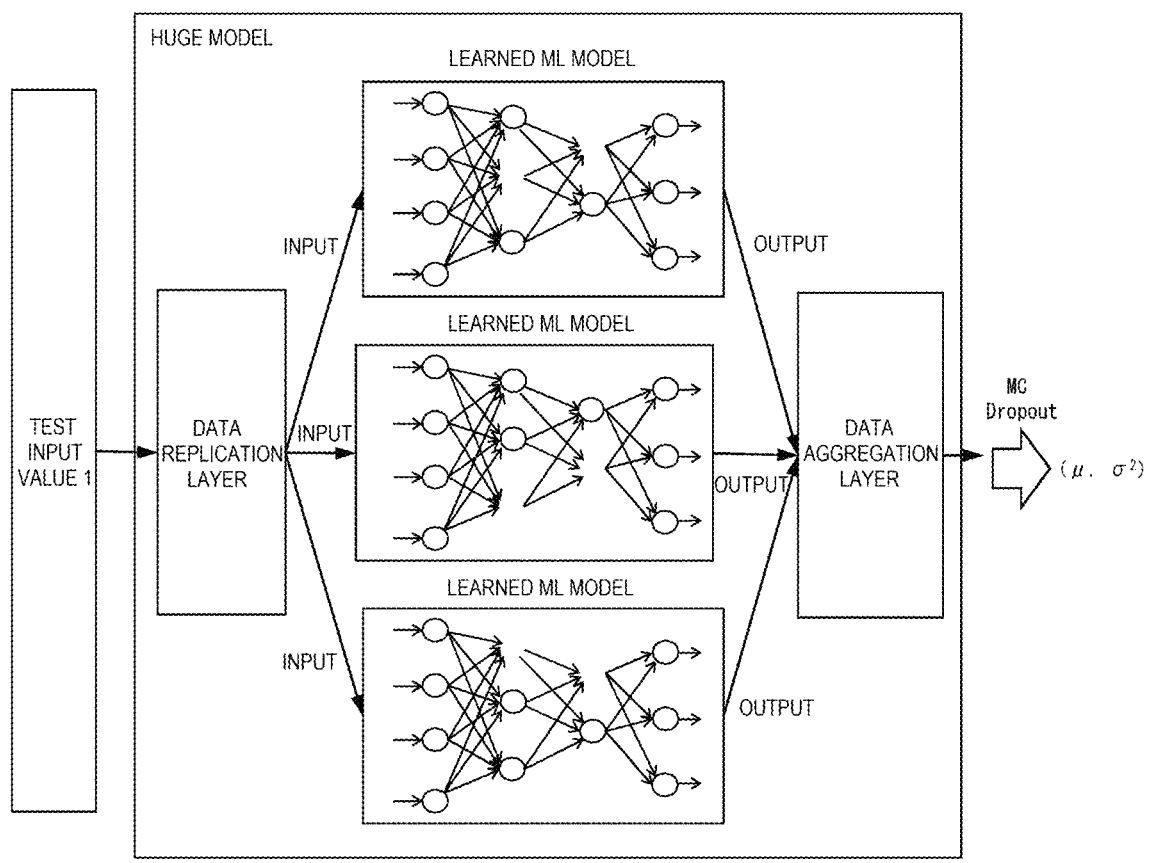
FIG. 7 is a diagram illustrating a conceptual example of the data-creation assistance method according to the first embodiment.

Further, as illustrated in FIG. 7, the data-creation assistance apparatus 100 may assume a configuration in which a plurality of learned models 110 are stored in advance.

In this case, the data-creation assistance apparatus 100 acquires the inference results from each of the plurality of learned models 110 by inputting the test data to each of the plurality of learned models 110, and acquires uncertainty data of the test data by aggregating the variances related to the inference results (for example, calculating an average of values of the variances).

Second Embodiment

Figure 8:
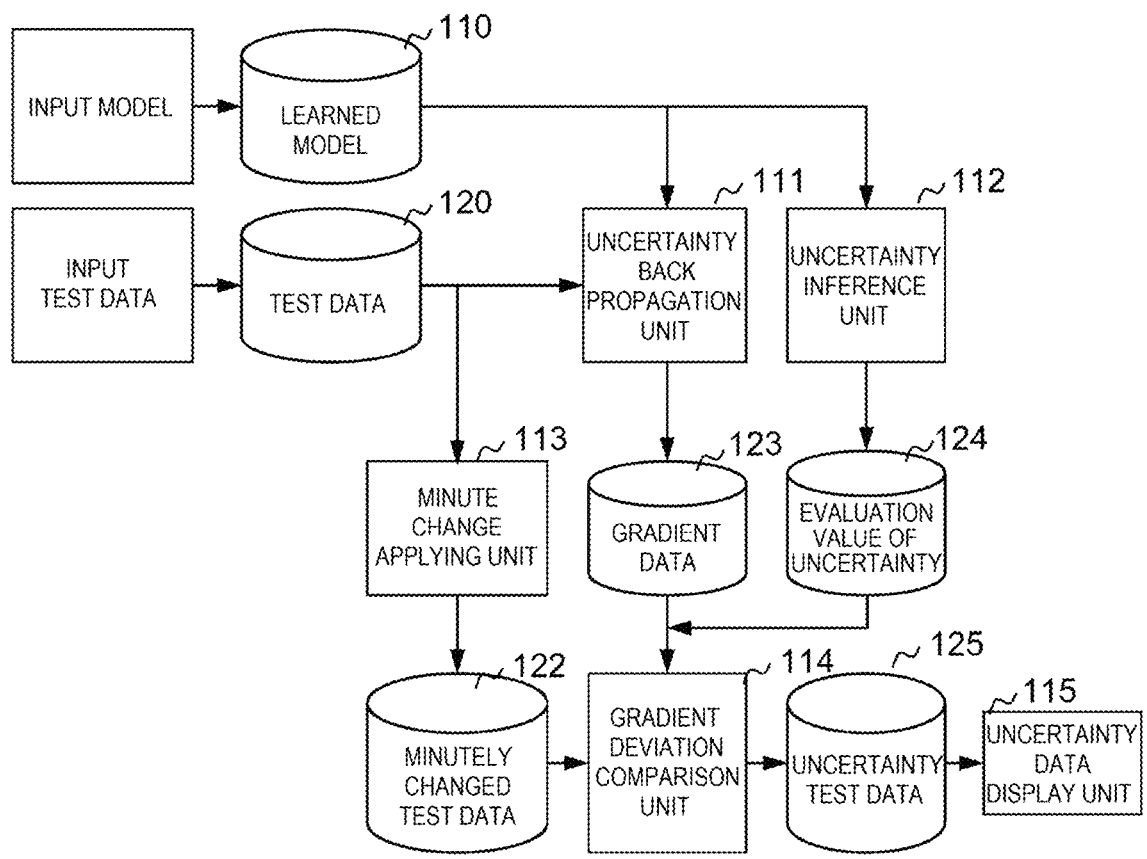
FIG. 8 is a diagram illustrating a functional configuration example of a data-creation assistance apparatus according to a second embodiment.
Figure 9:
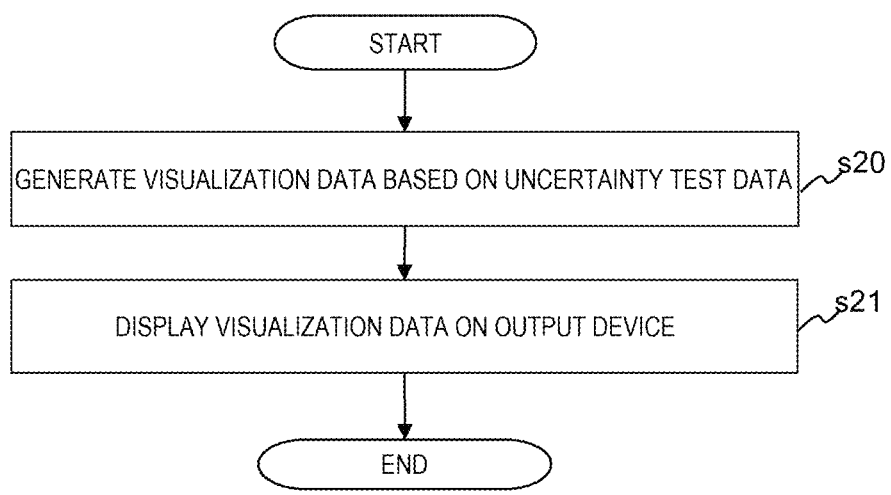
FIG. 9 is a diagram illustrating an example of a flow of a data-creation assistance method according to the second embodiment.

Next, an example of a flow of a data-creation assistance method according to the second embodiment will be described with reference to drawings. FIG. 8 is a diagram illustrating a functional configuration example of the data-creation assistance apparatus 100 according to the second embodiment, and FIG. 9 is a diagram illustrating an example of a flow of the data-creation assistance method according to the second embodiment. In the configuration of FIG. 8, the uncertainty data display unit 115 is a difference from the configuration in the first embodiment (the configuration of FIG. 3).

In this case, the uncertainty data display unit 115 generates visualization data 126 by, for example, setting information of the uncertainty test data 125 obtained by the gradient deviation comparison unit 114 to a screen format stored in advance (s20).

Further, the uncertainty data display unit 115 displays the visualization data 126 described above on the output device 106 (s21), and this process is ended.

Figure 10:
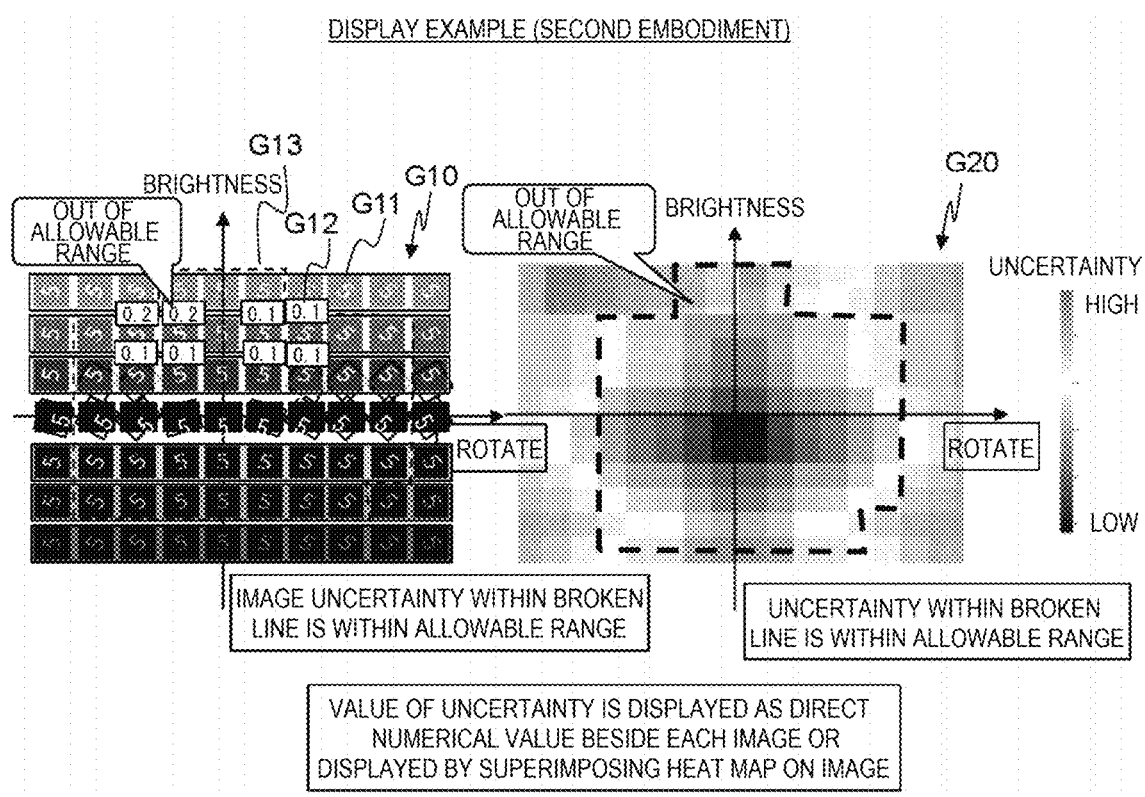
FIG. 10 is a diagram illustrating an output example of according to the second embodiment.

An example of a screen G10 on which the visualization data 126 is displayed is illustrated in FIG. 10. As illustrated by the screen G10 in FIG. 10, the visualization data 126 includes, for example, images G11 indicating "5" as a plurality of minutely changed test data, which are disposed on an axis plane for each direction of minute changes thereof. In this example, the axis plane is assumed in which changes in rotation angles of the images of "5" are on a horizontal axis and changes in brightness are on a vertical axis.

As shown in the figure, the images of "5" are rotated to the right as they move to the right, and rotated to the left as they move to the left on the axis plane. Further, the brightness of such images of "5" increase as they move upward, and decrease as they move downward on the axis plane.

Further, on the screen G10, each image G11, which is each piece of minutely changed test data, is associated with a variance value G12, which is an evaluation value of an uncertainty thereof.

Further, on the screen G10, regarding a set of each image G11 which is each piece of minutely changed test data and each variance value G12 of each image G11, in order to show that each variance value is above or below a predetermined threshold, for example, highlighting is performed to make a color or a pattern of an image G11 different from that of another image G11. In the example of FIG. 10, a user specifies that variances of images within the range of broken lines G13 are within an allowable range, but specific images are not within the allowable range.

Further, as shown on a screen G20, each variance value of each image G11 may be sequentially changed and displayed in a color corresponding to a magnitude of each variance value. When such display control is performed, a heat map is displayed like the screen G20.

Third Embodiment

Figure 11:
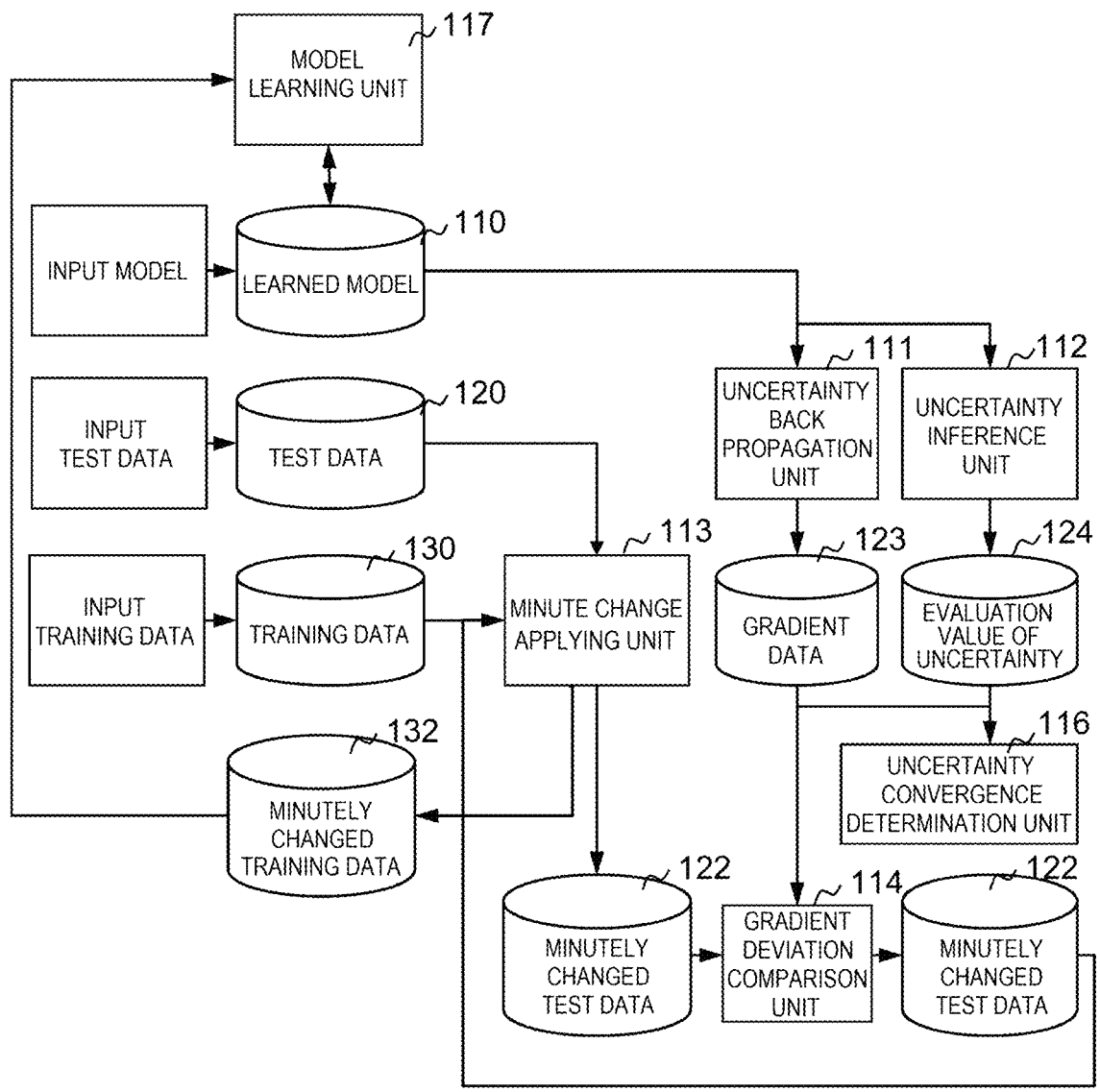
FIG. 11 is a diagram illustrating a functional configuration example of a data-creation assistance apparatus according to a third embodiment.
Figure 12:
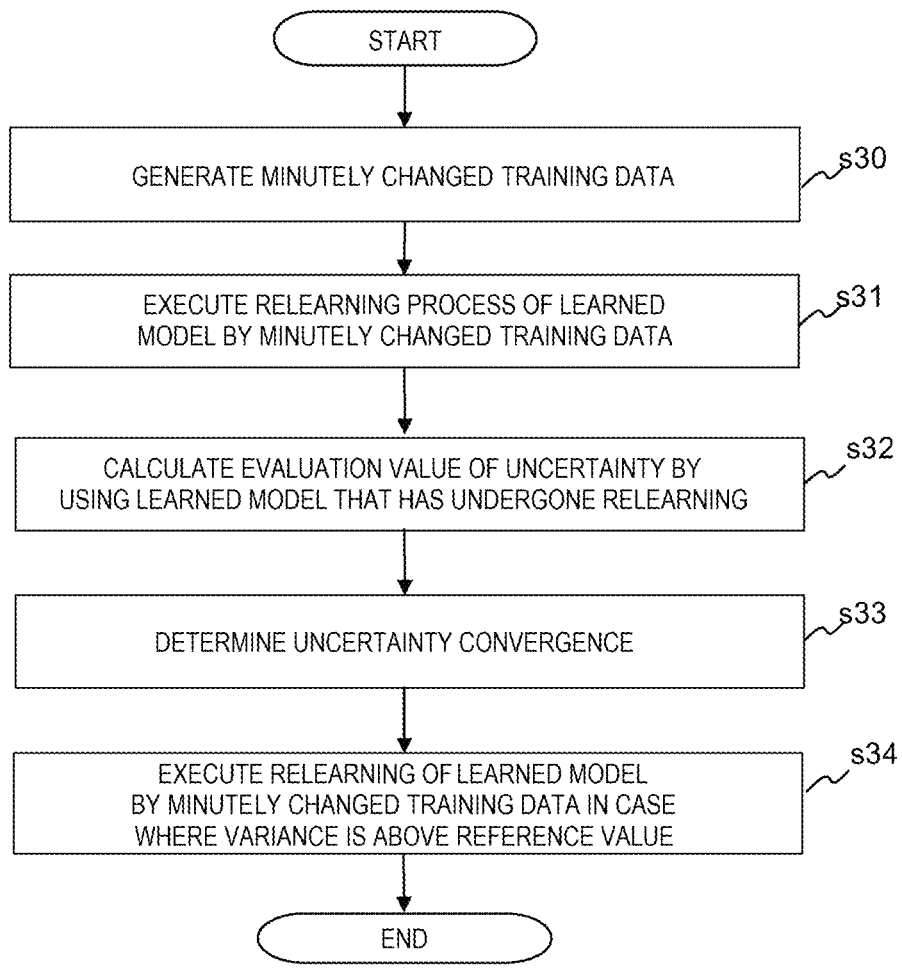
FIG. 12 is a diagram illustrating an example of a flow of a data-creation assistance method according to the third embodiment.
Figure 13:
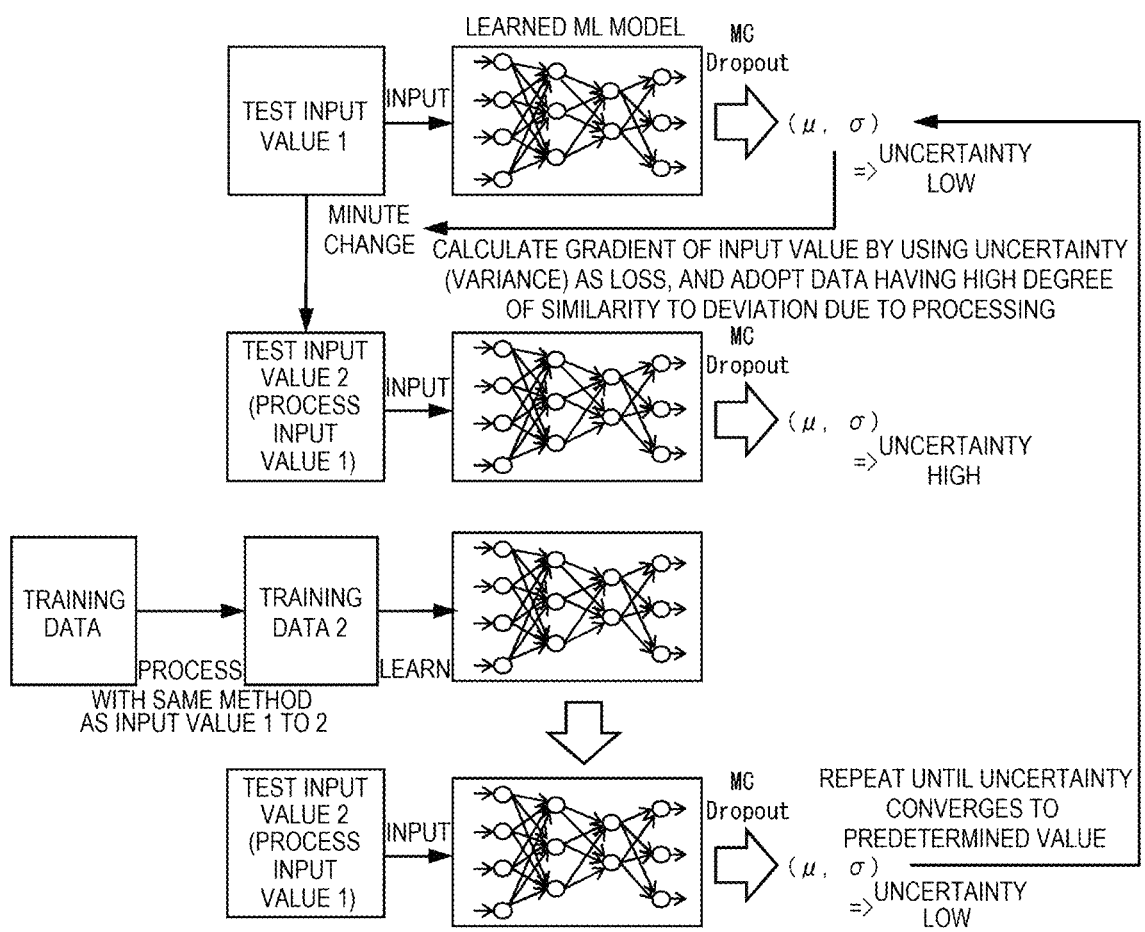
FIG. 13 is a diagram illustrating a conceptual example of the data-creation assistance method according to the third embodiment.

Next, an example of a flow of a data-creation assistance method according to a third embodiment will be described with reference to drawings. FIG. 11 is a diagram illustrating a functional configuration example of a data-creation assistance apparatus 100 according to the third embodiment, FIG. 12 is a diagram illustrating an example of a flow of the data-creation assistance method according to the third embodiment, and FIG. 13 is a diagram illustrating an example of function outline according to the third embodiment.

The third embodiment corresponds to an aspect in which training data is created separately from test data. In this case, it is assumed that the data-creation assistance apparatus 100 stores, in the storage device 101, a plurality of training data 130 used for supervised machine learning together with labels of ground truth.

In this case, the minute change applying unit 113 of the data-creation assistance apparatus 100 uses the training data 130 (attached with a label of ground truth) stored in the storage device 101 as an input, uses the minute change vector 131 included in the minutely changed test data 122 to generate the minutely changed training data 132 obtained by minutely changing the training data 130 (s30).

The model learning unit 117 of the data-creation assistance apparatus 100 further executes a relearning process of the learned model 110 (that is, neural network model) by giving the minutely changed training data 132 obtained in s30 described above to the learned model 110 by the machine learning program 1021 (s31).

In this case, the uncertainty inference unit 112 of the data-creation assistance apparatus 100 uses the learned model 110 that has undergone the relearning to specify the evaluation value 124 of the uncertainty such as the variance described above by using a predetermined test data as an input (s32).

In addition, the uncertainty convergence determination unit 116 determines whether the uncertainty, that is, the variance is above or below a predetermined threshold, and acquires a determination result as the determination result 134 of the uncertainty convergence (s33). Each process up to this determination is, for example, repeatedly executed until the variance value reaches the threshold.

The uncertainty convergence determination unit 116 displays the acquired determination result 134 on, for example, the output device 106.

Further, in a case where the variance, which is the uncertainty described above, is above (or below) the predetermined threshold, the model learning unit 117 of the data-creation assistance apparatus 100 further advances, the relearning process of the learned model 110 by giving the minutely changed training data 132 to the learned model 110 (S34), and this process is ended.

Although the embodiments for carrying out the invention have been specifically described above, the invention is not limited to this, and various modifications can be made without departing from the gist thereof.

According to the present embodiment, it is possible to verify a robustness of a learning model with respect to specifications (various minute changes) without preparing a large amount of test data in advance, and it is possible to improve the robustness by using uncertainty data (weakness) for the learning model.

Namely, it is possible to efficiently verify and improve the robustness of the learning model for supervised machine learning.

At least the following is clarified by the description in the present description. That is, in the data-creation assistance apparatus of the present embodiment, the computing device may, in the process of specifying the uncertainty, execute a dropout inference process a plurality of times, acquire a plurality of dropout inference results, and specify a variance related to the plurality of dropout inference results as an uncertainty. In this process, the test data is used as an input, an output of neurons included in the neural network model is randomly set to 0, and an inference result is output.

Accordingly, it is possible to obtain information of variance by inferring efficiently and quickly, as compared with a method such as a Bayesian neural network, which tends to require a large number of resources. As a result, it is possible to more efficiently verify and improve the robustness of the learning model for supervised machine learning.

Further, in the data-creation assistance apparatus of the present embodiment, the computing device may, in response to acquire the gradient information, calculate a gradient of the test data by a back propagation process in which the variance of the acquired dropout inference results is used as a loss function, and in response to specify one piece of the plurality of minutely changed test data, compare the plurality of minutely changed test data with the gradient information, and specify one piece of minutely changed test data and a minute change vector that are most similar to the gradient indicated by the gradient information.

Accordingly, it is possible to efficiently specify and generate minutely changed test data which is similar to a tendency of the gradient and provide the test data to the learning model. As a result, it is possible to more efficiently verify and improve the robustness of the learning model for supervised machine learning.

Further, in the data-creation assistance apparatus of the present embodiment, the computing device may, in the process of the dropout inference, use an inference result to an intermediate layer of the neural network.

According to this, it is possible to measure the uncertainty with respect to a partial recognition related to an event indicated by the test data in the neural network. As a result, it is possible to more efficiently verify and improve the robustness of the learning model for supervised machine learning.

Further, in the data-creation assistance apparatus of the present embodiment, the computing device may, acquire inference results from each of the plurality of neural networks by inputting the test data into each of the plurality of neural network models, and specify a variance related to the inference results as the uncertainty.

According to this, it is expected to more efficiently measure the uncertainty for the partial recognition described above by using a huge model including a plurality of learned models as one model. As a result, it is possible to more efficiently verify and improve the robustness of the learning model for supervised machine learning.

Further, in the data-creation assistance apparatus of the present embodiment, the computing device may further execute a process of displaying a set of the minutely changed test data and the uncertainty information of the minutely changed test data.

According to this, a person in charge of managing and constructing the machine learning model is capable of obtaining visual information about directions of the minute changes in the test data and a viewpoint of the uncertainty in that case, and is capable of easily confirming the visual information. Further, a result confirmed in such a way can be fed back to a subsequent operation. As a result, it is possible to more efficiently verify and improve the robustness of the learning model for supervised machine learning.

Further, in the data-creation assistance apparatus of the present embodiment, the computing device may further execute a process of displaying the set of the minutely changed test data and the uncertainty information of the minutely changed test data, and displaying that the uncertainty information is above or below a predetermined threshold.

Accordingly, the person in charge of managing and constructing the machine learning model is capable of obtaining the visual information about directions of the minute changes in the test data and the viewpoint of the uncertainty in that case, and is capable of accurately determining the quality of the direction of the minute change and feeding the visual information back to the subsequent operation. As a result, it is possible to more efficiently verify and improve the robustness of the learning model for supervised machine learning.

Further, in the data-creation assistance apparatus of the present embodiment, the storage device may store a plurality of training data used for supervised machine learning together with labels of ground truth, and the computing device may further execute a relearning process of the neural network model by using the training data as an input, using the minute change vector included in the minutely changed test data to generate minutely changed training data obtained by minutely changing the training data, and giving the minutely changed training data to the neural network model.

According to this, the training data are also slightly changed in the same manner as the test data, so that it is possible to efficiently verify and improve the robustness. As a result, it is possible to more efficiently verify and improve the robustness of the learning model for supervised machine learning.

Further, in the data-creation assistance apparatus of the present embodiment, the computing device may execute a process of using the neural network model that has undergone the relearning, specifying an uncertainty by using the test data as an input, and displaying information indicating that the uncertainty is above or below the predetermined threshold; and a process of relearning of the neural network model by giving the minutely changed training data to the neural network model in a case where the uncertainty is above or below the predetermined threshold.

According to this, it is possible to further efficiently verify and improve the robustness of the neural network model by using the minutely changed training data in accordance with the quality of uncertainty based on the test data. As a result, it is possible to more efficiently verify and improve the robustness of the learning model for supervised machine learning.

What is claimed is:

1. A data-creation assistance apparatus comprising:
   a storage device configured to store a neural network model used for supervised machine learning and test data attached with a label of ground truth; and
   a computing device configured to execute
   a process of specifying an uncertainty of an inference result from the neural network model by inputting the test data to the neural network model,
   a process of acquiring gradient information of the test data by a back propagation process using the uncertainty as a loss,
   a process of generating a plurality of minutely changed test data obtained by applying a various minute change to the test data, and calculating deviations between each of the plurality of minutely changed test data and the test data; and
   a process of specifying, based on the uncertainty information, the gradient information, and the deviations, the minute change that increases or decreases the uncertainty or the minutely changed test data to which the minute change is applied;
   wherein when executing the process of specifying the uncertainty, the computing device is further configured to:
   execute a process of dropout inference, in which the test data is used as an input, an output of neurons included in the neural network model is randomly set to 0, and an inference result is output, a plurality of times,
   acquire a plurality of dropout inference results, and specify a variance related to the plurality of dropout inference results as the uncertainty.

2. The data-creation assistance apparatus according to claim 1, wherein
   the computing device is further configured to in response to
   acquire the gradient information, calculate the gradient of the test data by the back propagation process in which the variance of the plurality of acquired dropout inference results is used as a loss function, and
   in response to specify the minutely changed test data, compare the minutely changed test data with the gradient information, and specify minutely changed test data and a minute change vector that are most similar to the gradient indicated by the gradient information.

3. The data-creation assistance apparatus according to claim 1, wherein
   the computing device is further configured to
   in the process of dropout inference, use the inference result up to an intermediate layer of the neural network.

4. The data-creation assistance apparatus according to claim 3, wherein
   the computing device is further configured to
   acquire an inference result from each of the plurality of neural network models by inputting the test data to each of the plurality of neural network models, and specify a variance related to the inference result as the uncertainty.

5. The data-creation assistance apparatus according to claim 1, wherein
   the computing device is further configured to
   execute a process of displaying a set of the minutely changed test data and uncertainty information of the minutely changed test data.

6. The data-creation assistance apparatus according to claim 1, wherein
   the computing device is further configured to
   execute a process of displaying a set of the minutely changed test data and uncertainty information of the minutely changed test data, and displaying that the uncertainty information is above or below a predetermined threshold.

7. The data-creation assistance apparatus according to claim 1, wherein
   the storage device is configured to
   store a plurality of training data used for supervised machine learning together with the label of ground truth, and
   the computing device is further configured to
   execute a relearning process of the neural network model by using the plurality of training data as an input, using minute change vector included in the minutely changed test data to generate minutely changed training data obtained by applying minute change to the training data, and giving the minutely changed training data to the neural network model.

8. The data-creation assistance apparatus according to claim 7, wherein
   the computing device is further configured to
   execute a process of specifying the uncertainty by using the neural network model that has undergone the relearning and using the test data as the input, and displaying information indicating that the uncertainty is above or below a predetermined threshold, and execute, when the uncertainty is above or below the predetermined threshold, the relearning process of the neural network model by giving the minutely changed training data to the neural network model.

9. A data-creation assistance method realized by an information processing apparatus that is configured to execute:

a process of storing a neural network model used for supervised machine learning and test data attached with a label of ground truth, inputting the test data into the neural network model, and specifying an uncertainty of an inference result from the neural network model;

a process of acquiring gradient information of the test data by a back propagation process using the uncertainty as a loss;

a process of giving various minute changes to the test data to generate a plurality of minutely changed test data, and calculating deviations between each of the plurality of minutely changed test data and the test data; and a process of specifying, based on information of the uncertainty, the gradient information, and the deviations, a minute change that increases or decreases the uncertainty or minutely changed test data to which the minute change is applied;

wherein when specifying the uncertainty, the information processing apparatus is further configured to:

execute a process of dropout inference, in which the test data is used as an input, an output of neurons included in the neural network model is randomly set to 0, and an inference result is output, a plurality of times, acquire a plurality of dropout inference results, and specify a variance related to the plurality of dropout inference results as the uncertainty.

* * * * *